United States Patent
Diem

(10) Patent No.: US 6,963,047 B2
(45) Date of Patent: Nov. 8, 2005

(54) DEVICE FOR ACCOMMODATING FLAT MATERIALS DURING SEPARATION BY A SEPARATING DEVICE, AND A SEPARATING METHOD

(76) Inventor: Reinhard Diem, Wilhelmstr. 62, 71083 Herrenberg (DE)

( * ) Notice: Subject to any disclaimer, the term of this patent is extended or adjusted under 35 U.S.C. 154(b) by 27 days.

(21) Appl. No.: 10/484,668
(22) PCT Filed: Jul. 16, 2002
(86) PCT No.: PCT/DE02/02601
§ 371 (c)(1), (2), (4) Date: Jun. 23, 2004
(87) PCT Pub. No.: WO03/016004
PCT Pub. Date: Feb. 27, 2003

(65) Prior Publication Data
US 2004/0237735 A1 Dec. 2, 2004

(30) Foreign Application Priority Data
Jul. 24, 2001 (DE) .................................. 201 12 006 U

(51) Int. Cl.$^7$ ............................................. B23K 26/38
(52) U.S. Cl. ............................ 219/121.67; 219/121.72; 219/121.82
(58) Field of Search .................... 219/121.6, 121.67, 219/121.72, 121.82, 121.85, 121.18, 158, 161; 83/78, 157

(56) References Cited

U.S. PATENT DOCUMENTS

| | | | | |
|---|---|---|---|---|
| 4,058,040 A | * | 11/1977 | Fisher | 83/177 |
| 4,787,178 A | * | 11/1988 | Morgan et al. | 451/81 |
| 4,790,224 A | * | 12/1988 | Krutilla et al. | 83/53 |

* cited by examiner

Primary Examiner—Samuel M. Heinrich
(74) Attorney, Agent, or Firm—Bachman & LaPointe, P.C.

(57) ABSTRACT

The invention relates to a device for accommodating flat materials when separated by laser, water-jet, cutting torch or milling. The slot provided under the separating device is displaced by enlarging one bearing surface and reducing the size of the other bearing surface when the separating device is moved, whereby damage to the bearing surface is reduced when cutting any particular contours. The invention enables separation, targeted sorting of the separated parts and the clearing away of the remaining materials.

10 Claims, 3 Drawing Sheets

US 6,963,047 B2

DEVICE FOR ACCOMMODATING FLAT MATERIALS DURING SEPARATION BY A SEPARATING DEVICE, AND A SEPARATING METHOD

FIELD OF THE INVENTION

The present invention relates to a support apparatus for mounting planar materials during the cutting-off of planar materials resting on a support table by means of a cutting-off device which is movable during the cutting-off operation in an X feed direction and in a Y feed direction running at right angles to the X feed direction. It also relates to a method of cutting off planar materials, in the course of which use is made of the support apparatus.

PRIOR ART

During the cutting-off of planar materials, for example by means of a laser, cutting torch, water jet or a milling cutter in a CNC machining center, it is necessary for there to be a clearance space under the respective cutting-off device and the material to be cut off, so that the cut-off operation can be carried out undisturbed and precisely and the support itself is also not damaged. In particular in the case of laser cutting-off devices, it is normal practice to mount the planar material on bar grates or interchangeable prongs of a fork (see, for example, DE 199 05 005 A1), although the supports are nonetheless damaged during a cutting-off operation. After a certain time, the support has to be exchanged, since the gradually reduced support surface at individual tips on which the parts rest, in particular in the case of smaller parts, leads to tilting of the parts, so that proper cutting-off is no longer possible or the laser optics are damaged the next time this location is passed. There is also the fact that swirling of the inert gas surrounding the laser occurs at new bar grates or forks, and this swirling leads to untidy cuts.

DE 196 42 159 A1 discloses an apparatus for processing flat material, in particular lengths of fabric, in which individual layers of flat material can also be reliably processed when loosely supported. To this end, the support has a flexible foil which is fastened at two ends and contains movable deflection means for deflecting the foil in the processing region. By the movable deflection means, which are rigid per se, a gap is moved back and forth in the processing region with the processing unit. This apparatus is suitable in particular for processing flat material, in particular lengths of fabric, curtains or the like but is not suitable for heavy, plate-shaped material.

U.S. Pat. No. 4,058,040 describes a slotted machining table for a high-pressure-liquid cutting device having a frame, movable on rails, for the nozzle. A flexible carrying material is fixed at both ends and is deflected in the region of the nozzle via rollers, so that the gap is moved along with the nozzle during a movement of the frame. The width of the gap of the support table is determined by the fixed distance between deflecting rods and is not variable. The frame arrangement with the nozzle and the deflecting rods is moved relative to an outer frame, to which the flexible carrying material is fastened.

WO 95/15837 likewise describes a water-jet cutting machine with a support, in which the gap can be displaced in accordance with the movement of the nozzle by deflected transport belts.

DE 39 17 253 C2 also describes an apparatus for cutting coated strip material, in which apparatus a retaining belt, for forming a recess below the cutting head, are deflected via rollers. The gap is moved along with the cutting-off device when the latter is moved.

DE 199 43 043 A1 discloses a machine and a method for the thermal cutting, in particular laser cutting, of workpieces, this method involving the removal of both the cut workpieces and the workpiece scrap without any parts being welded to the workpiece support during the cooling. For this purpose, various measures are taken which are distinguished in particular by a stop, the stop and the workpiece support being movable relative to one another while cutting stock adhering to the latter is released.

It can be seen from this prior art that, in particular for laser cutting, no apparatus is known which, on the one hand, prevents adhering of the workpiece parts to the support table and, on the other hand, permits simple cutting-off and removal of the workpieces and also of the scrap.

SUMMARY OF THE INVENTION

The object of the present invention is therefore to provide a remedy here and to propose a means by which a robust support can be achieved and in which at the same time neat cutting-off of the material and specific removal of the material and of the cutting scrap is possible.

This object is achieved according to the invention by an apparatus having the features of claim 1. Further advantageous configurations can be gathered from the respective subclaims that refer back. The object is also achieved by a machine for cutting plate-shaped materials having a support apparatus of corresponding design.

According to the invention, two spaced-apart support tables variable in the support surface are arranged with a gap in the X feed direction between the support surfaces below the cutting-off device, and then the gap, during a movement of the cutting-off device in the X feed direction, is adapted by varying the size of the support tables at least in the direct vicinity of the cutting-off device. By varying the size of the support tables, the gap is either enlarged in its width or, with the same width, is moved along with the cutting-off device. The enlargement of the gap can be advantageous or even disadvantageous in the case of smaller parts to be cut out. It can be considered to be advantageous if these smaller parts already fall into a container underneath and are thus removed; it may be disadvantageous if the parts, depending on the cutting-off operation, already fall down at an undesirable moment. This is simple to realize in terms of control, since the signal for the movements of the cutting-off device in the Y feed direction can at the same time be used for varying the size of the support surfaces of the first and the second support table. The gap is displaced by reciprocal varying of the support surface of the first and the second support table, so that the enlargement of the one support surface is accompanied by a decrease in size of the other support surface. In principle, it is possible, by means of a multiplicity of control operations, to widen or displace the gap merely in the region of the cutting-off device. However, the gap is preferably varied over the entire width of the support. The gap is moved synchronously with the cutting-off device.

Each support table has a carrier arrangement fixed on one side and movable in the Y direction. The carrier arrangements are reciprocally movable during the cutting-off operation for moving the gap in accordance with the movement of the cutting-off device. After the cutting-off operation, the carrier arrangements, for the specific removal of cut-out parts of the same size, are movable independently of one another for enlarging the gap or, for removing different parts, are reciprocally movable in opposition as a function of the size of the latter with corresponding gap width. It is thus possible to set the gap to a desired width and then to remove first of all the smaller cut-out parts into a container located underneath and then the larger parts into another container located underneath.

According to one embodiment, the enlargement of the one support and the simultaneous reduction in size of the other support is carried out by deflecting individual links, connected to one another, of a link chain forming the respective support surface. Depending on the design, the deflection can be carried out in the region of the gap or at the opposite margin of each support.

The first and the second support table preferably each have a link chain having a multiplicity of links with a top flat side which forms the respective support surface and also a deflecting device arranged at one end of each support surface. By deflection of the respective link chain, the support surface can be adapted to the corresponding requirements and thus the gap can be either enlarged or displaced. Depending on the configuration, the deflection device, as already indicated above, can be arranged in the region of the gap or at the opposite end of the support surface.

The carrier arrangement for the link chain may be carrier rods displaceable in this direction, supports movable on the floor on rollers or air cushions, or advantageously carrying arms which are fixed on one side. The latter are then expediently telescopically extendable and have deflection rollers at the end facing the gap. Therefore only two controllable telescopic carrying arms are required over the width of the support table, whereas the telescopic arms lying in between and possibly necessary for the carrying capacity do not have to be controlled. At the free ends, the carrying rollers can be connected via a rod which also carries corresponding guide rollers. A more expensive possibility consists in providing a plurality of link chains for a support table, these link chains being controllable separately, so that the gap is varied only in the region of the cutting-off device.

The mechanical connection of the link chains is advantageously by means of a cable line or the like, so that, when the one support surface is enlarged, the other support surface is reduced in size at the same time. In this case, the gap is kept constant in its width and is moved with the cutting-off device in the Y direction.

For the above-mentioned removal, the gap of the can be enlarged by shortening the cable line and can then be moved again by the reciprocal variation of the support surfaces. If complete removal is to be effected at once, either the one support surface or also both support surfaces are reduced to the minimum size.

During cut-off milling, with regard to light materials which have to be fixed to the respective support so that they do not move during the cutting-off operation, the individual chain links can be designed as hollow profiles which are connected to a vacuum source and have air openings, at least on the top side, in order to draw in and hold in place the material to be machined. Appropriate seals and closures can achieve the effect that the chain links arriving or leaving in the region of the gap are connected to or separated from the suction source.

By the use of chain links as hollow profiles, it is also possible to allow a cooling liquid to flow through these chain links, so that the part to be cut off is immediately cooled in the region of the cutting-off point. To this end, the chain links are likewise successively connected to one another via a valve device and connected to the coolant flow.

The object of the present invention is also to specify a means by which the support table according to the invention can be freed in a simple manner from parts resting thereon.

This object is achieved by a method according to the features of the subordinate method claim. Accordingly, the gap is closed during the cutting between the support tables to the minimum necessary for the passage of the respective cutting-off device. The enlargement of or decrease in size of the support surface of the respective support tables is effected synchronously to the Y feed direction. Once all the parts have been cut out of the plate-shaped material, the gap is moved to a size which is slightly larger than that of the parts. The gap is them moved over the entire surface, so that the cut-off parts can fall through the gap, for example into a goods basket located underneath. The parts are thus obtained in a simple manner.

The residual material can then be removed by the gap width being increased to the maximum, so that the plate residues can fall into a scrap basket already kept ready for this purpose.

DESCRIPTION OF THE FIGURES

The invention is explained in more detail below with reference to an exemplary embodiment. In the drawing.

DESCRIPTION OF A PREFERRED EXEMPLARY EMBODIMENT

Figure 1:
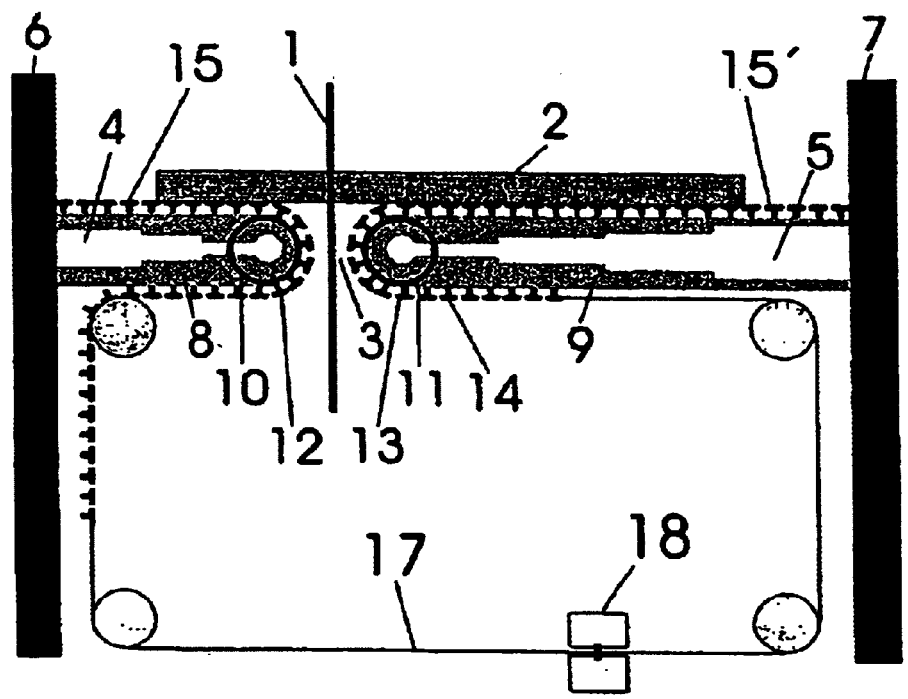
FIG. 1 shows a schematic diagrammatic representation of a support apparatus in side view.

FIG. 1 shows the principle according to the invention using a support device for laser cutting units as an example. As can be seen from the figure, the laser jet 1, which cuts through the workpiece 2, is arranged exactly above a gap 3 between two support tables 4 and 5. The support tables 4 and 5 are fixed on one side in a frame 6 and 7 and each have at least two telescopically extendable carrying arms 8 and 9. The latter may be designed as an oil-pressure telescope or in another manner familiar to the person skilled in the art and suitable for the application. Depending on the carrying capacity, a plurality of carrying arms 8, 9 may be arranged in a distributed manner over the width of the respective support table, the controllable carrying arms 8, 9 being connected to the noncontrollable carrying arms, for example via a corresponding rod, in order to move said noncontrollable carrying arms. Located at the free end of the carrying arms 8, 9 is a deflection means, for example in the form of a roller, which is shown schematically in FIG. 1 and is identified by the reference numeral 10 or 11, respectively. Lying on each of the carrying arms 8, 9 is a link chain 12, 13, the individual chain links 14 of which form the top side of the support surfaces 15, 15'. On the underside, the individual chain links, as shown in FIG. 2C, have, for example, guides 16 on which the telescopic extensions 8 shown by way of example in FIGS. 2A and 2B rest in corresponding notches. The link chains 12, 13 are deflected at the free end of the carrying arms 8, 9 by means of the rollers 10, 11, so that, during a movement of the carrying arms, the support surfaces 15, 15' are correspondingly enlarged or reduced in size. In the exemplary embodiment, the free ends of the link chains 12, 13 are connected to one another via a cable line 17, so that the enlargement of the support surface 15 or 15' on one support at the same time brings about the reduction in size of the support 15' or 15, respectively, on the other support. For the control, a light barrier 18, via which the position is determined, can be provided in the region of the cable line. In terms of control, the signal which moves the laser in the Y direction is at the same time applied to the respective control devices for the carrying arms.

Figure 2:
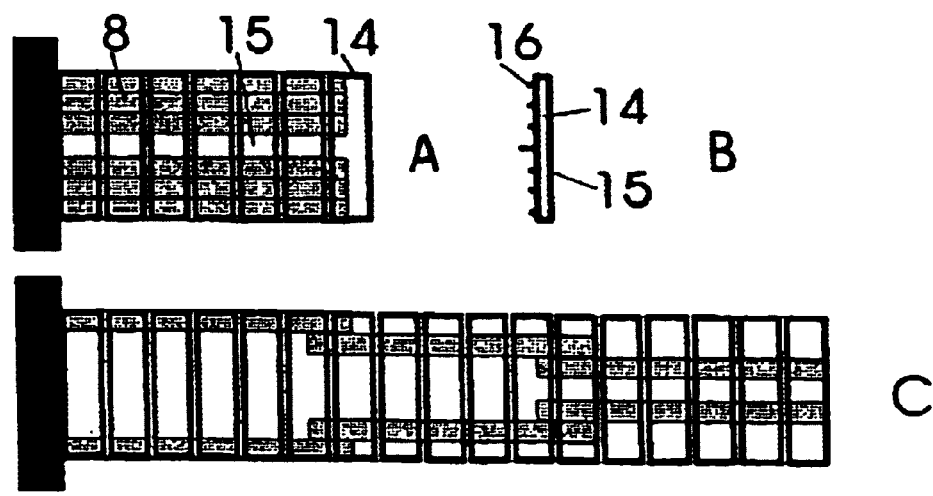
FIG. 2 shows the schematic plan view of a support with telescopic extensions in the retracted state (A) and the extended state (B) and a cross section through the link chain (C)

FIG. 2, in plan view, shows the support surface 15 of the support table 8 with the individual chain links 14, which rest on telescopic extensions as carrying arms. FIG. 2A shows the minimum support surface and FIG. 2B shows the maximum support surface.

Figure 3:
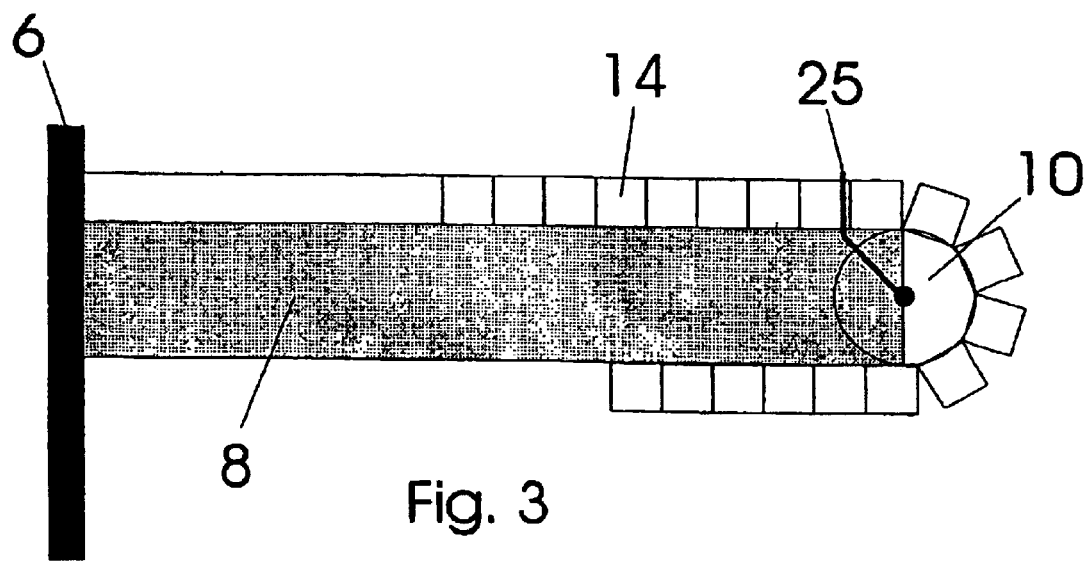
FIG. 3 shows a schematic side view of a carrier arrangement with telescopic extensions and chain links which are designed as a hollow profile.
Figure 4:
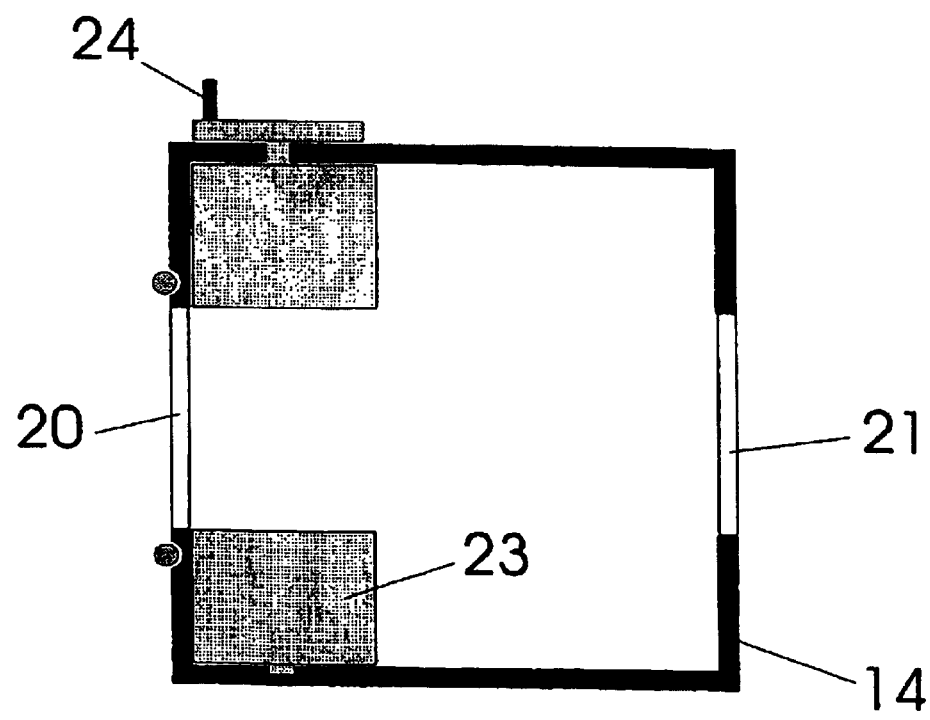
FIG. 4 shows a side view of a chain link with hollow profile.
Figure 5:
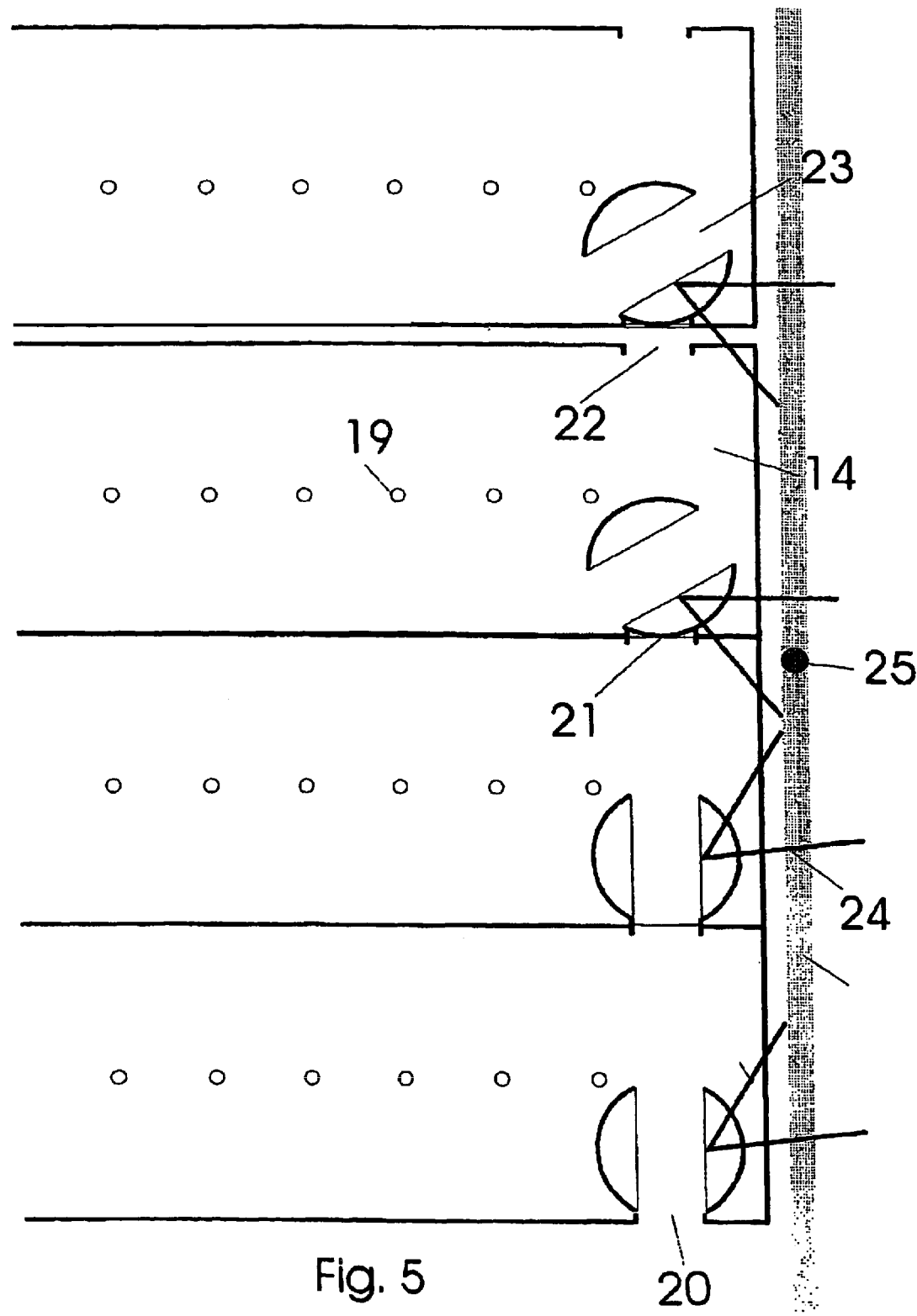
FIG. 5 shows the plan view of a plurality of hollow-profile chain links.

To provide a suction means in the case of materials to be cut, chain links can be provided as a hollow profile in the embodiment shown in the figures, and these chain links, as shown in FIG. 5, have holes 19 on the top side for drawing in the material and, via one opening 20, 21 each in the sides facing the two adjoining chain links, can be connected to the latter and to a vacuum source. Thus, according to FIG. 3, starting from the frame 6, 7, air is drawn off via the chain links. So that only the chain links actually serving as a support are effective, the openings facing the frame 6, 7 must be capable of being closed via a suitable valve devices 22. The latter progressively open up the respective opening 21 of the chain links which have run over the deflection means, so that one chain link 14 after the other is connected to the suction air or conversely separated again via the preceding chain links. This may be effected automatically, for example, by a rotary valve 23 having a rotary lever 24 which can be actuated from outside by means of an adjusting pin 25. In FIG. 5, the external actuation is only indicated in principle. Here, there are many possibilities of realizing the opening and closing of the rotary valve 23 via a rotary lever 24. If the chain links 14 are to be supplied with a cooling liquid, appropriate valve devices, for example rotary valves 23 as shown in FIG. 5, must be used at both openings 20, 21. In addition, the holes 19 shown in FIG. 5 are of course unnecessary.

What is claimed is:

1. A support apparatus for mounting plate-shaped materials in a cutting-off device which is movable in the X/Y direction during the cutting-off operation, the X feed direction being rectilinear and the Y apparatus being at right angles thereto, having a first support table (4) with a first support surface (15) and a second support table (5) with a second support surface (15'), the two support tables being at a distance from one another and forming a gap (3) which is located at least under the cutting-off device (1), and the gap (3) being variable by varying the size of the first and the second support table in the Y direction, characterized in that each support table (4, 5) has a carrier arrangement (8, 9) fixed on one side and movable in the Y direction, which carrier arrangements (8, 9) are movable in opposition to one another during the cutting-off operation for moving the gap (3) in accordance with the movement of the cutting-off device (1) and, after the cutting-off operation, for the specific removal of cut-out parts of the same size, are movable independently of one another for enlarging the gap (3) and, for removing different parts, are movable in opposition as a function of the size of the latter with corresponding gap width.

2. The support apparatus as claimed in claim 1, characterized in that the carrier arrangements are designed as carrying arms.

3. The support apparatus as claimed in claim 2, characterized in that the carrying arms are telescopically extendable.

4. The support apparatus as claimed in claim 1, characterized in that the first and the second support table each have a link chain (12, 13) having a multiplicity of links (14) with a top flat side which form the respective support surface (15, 15') and also a deflecting device (10, 11) arranged at one end of each support table.

5. The support apparatus as claimed in claim 4, characterized in that the link chain (12, 13) are connected to one another for the simultaneous enlargement of the one support surface and reduction in size of the other support surface.

6. The support apparatus as claimed in claim 4, characterized in that the chain links (14) are designed as hollow profiles.

7. The support apparatus as claimed in claim 6, characterized in that the chain links (14) have openings (20) on the top flat side, and the cavities of the chain links can be successively connected to one another via valve devices (23) and can be connected to a suction device.

8. The support apparatus as claimed in claim 6, characterized in that the cavities of the chain links (14) can be successively connected to one another via valve devices (23, 24) for receiving and passing through a cooling liquid.

9. A machine for cutting plate-shaped materials by means of a cutting-off device and a support apparatus as claimed in claim 1.

10. A method of cutting off plate-shaped materials by means of a cutting-off device on a support table which comprises a first support table (4) with a first support surface (15) and a second support table (5) with a second support surface (15'), said support tables being at a distance from one another and forming a gap (3) which is located at least under the cutting-off device (1), the cutting-off device being movable rectilinearly in an X feed direction during the cutting-off operation andLin a Y feed direction at right angles thereto, comprising the following steps:

moving the gap during the cutting-off operation under the cutting-off device synchronously with the latter by enlarging the support surface of one support table and by simultaneously reducing the size of the support surface of the other support table, enlarging the gap after the cutting-off operation to a slightly greater extent than the cut-off parts by reducing the size of the support surface of the support tables and moving this gap at least in the feed direction for sorting out the cut-off materials, and opening the gap to maximum size by reducing the size of the support surfaces for removing material residues.

* * * * *